United States Patent
Suto et al.

(10) Patent No.: US 12,062,516 B2
(45) Date of Patent: Aug. 13, 2024

(54) SWITCH AND WINDING SWITCHING DEVICE

(71) Applicant: Hitachi Astemo, Ltd., Hitachinaka (JP)

(72) Inventors: Tetsuya Suto, Tokyo (JP); Akeshi Takahashi, Tokyo (JP); Noriyuki Maekawa, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 246 days.

(21) Appl. No.: 17/795,596

(22) PCT Filed: Dec. 25, 2020

(86) PCT No.: PCT/JP2020/048707
§ 371 (c)(1),
(2) Date: Jul. 27, 2022

(87) PCT Pub. No.: WO2021/171777
PCT Pub. Date: Sep. 2, 2021

(65) Prior Publication Data
US 2023/0343523 A1    Oct. 26, 2023

(30) Foreign Application Priority Data
Feb. 28, 2020  (JP) ................ 2020-033921

(51) Int. Cl.
*H01H 9/00* (2006.01)
*H02K 11/20* (2016.01)

(52) U.S. Cl.
CPC ........ *H01H 9/0016* (2013.01); *H01H 9/0027* (2013.01); *H02K 11/20* (2016.01)

(58) Field of Classification Search
CPC .... H01H 9/0016; H01H 9/0027; H02K 11/20; H02K 11/0094; H02K 3/28;
(Continued)

(56) References Cited

U.S. PATENT DOCUMENTS

2010/0289356 A1* 11/2010 Kida ................ H02K 11/02
310/71
2012/0306424 A1* 12/2012 Naik ................ H02P 25/18
318/495
(Continued)

FOREIGN PATENT DOCUMENTS

JP    2007-49831 A    2/2007
JP    2012-95410 A    5/2012
(Continued)

OTHER PUBLICATIONS

International Search Report (PCT/ISA/210) issued in PCT Application No. PCT/JP2020/048707 dated Apr. 6, 2021 with English translation (four (4) pages).
Japanese-language Written Opinion (PCT/ISA/237) issued in PCT Application No. PCT/JP2020/048707 dated Apr. 6, 2021 (four (4) pages).

*Primary Examiner* — Ahmed Elnakib
(74) *Attorney, Agent, or Firm* — Crowell & Moring LLP

(57) ABSTRACT

High reliability and long life are achieved by being slidingless.
The switch according to the present invention includes: first terminal and a second terminal that are adjacently attached to a stator; a movable shaft movable in a first direction and a second direction, a plurality of movers attached to the movable shaft; and a movable segment that is connected to two of the plurality of movers and biases the two movers in a direction in which they are away from each other. The switch is capable of switching among: a first mode in which when the movers move in the first direction, the mover is pushed by the stator to deform the movable segment so as to protrude toward the terminal, and the movable segment comes into contact with the first terminal; an intermediate mode in which deformation of the movable segment by the movers is released, and the movable segment is in contact with neither the first terminal nor the second terminal; and a second mode in which when the movers move in the
(Continued)

second direction, the mover is pushed by the stator to deform the movable segment so as to protrude toward the terminal, and the movable segment comes into contact with the second terminal.

9 Claims, 6 Drawing Sheets

(58) Field of Classification Search
CPC .... H02K 2213/09; H01R 13/71; H01R 39/08; H01R 39/18; H02P 25/18; H02P 27/06; H02P 21/18; H02P 25/188
USPC ........................................................ 310/40 R
See application file for complete search history.

(56) References Cited

U.S. PATENT DOCUMENTS

| | | | |
|---|---|---|---|
| 2021/0044238 A1* | 2/2021 | Takahashi | H02P 21/141 |
| 2022/0224270 A1* | 7/2022 | Sugimoto | H02P 25/18 |
| 2022/0337184 A1* | 10/2022 | Nishihama | H02P 25/188 |
| 2023/0343523 A1* | 10/2023 | Suto | H02P 25/18 |

FOREIGN PATENT DOCUMENTS

| | | |
|---|---|---|
| JP | 2012-110169 A | 6/2012 |
| JP | 2017-17953 A | 1/2017 |
| JP | 2017-70112 A | 4/2017 |

\* cited by examiner

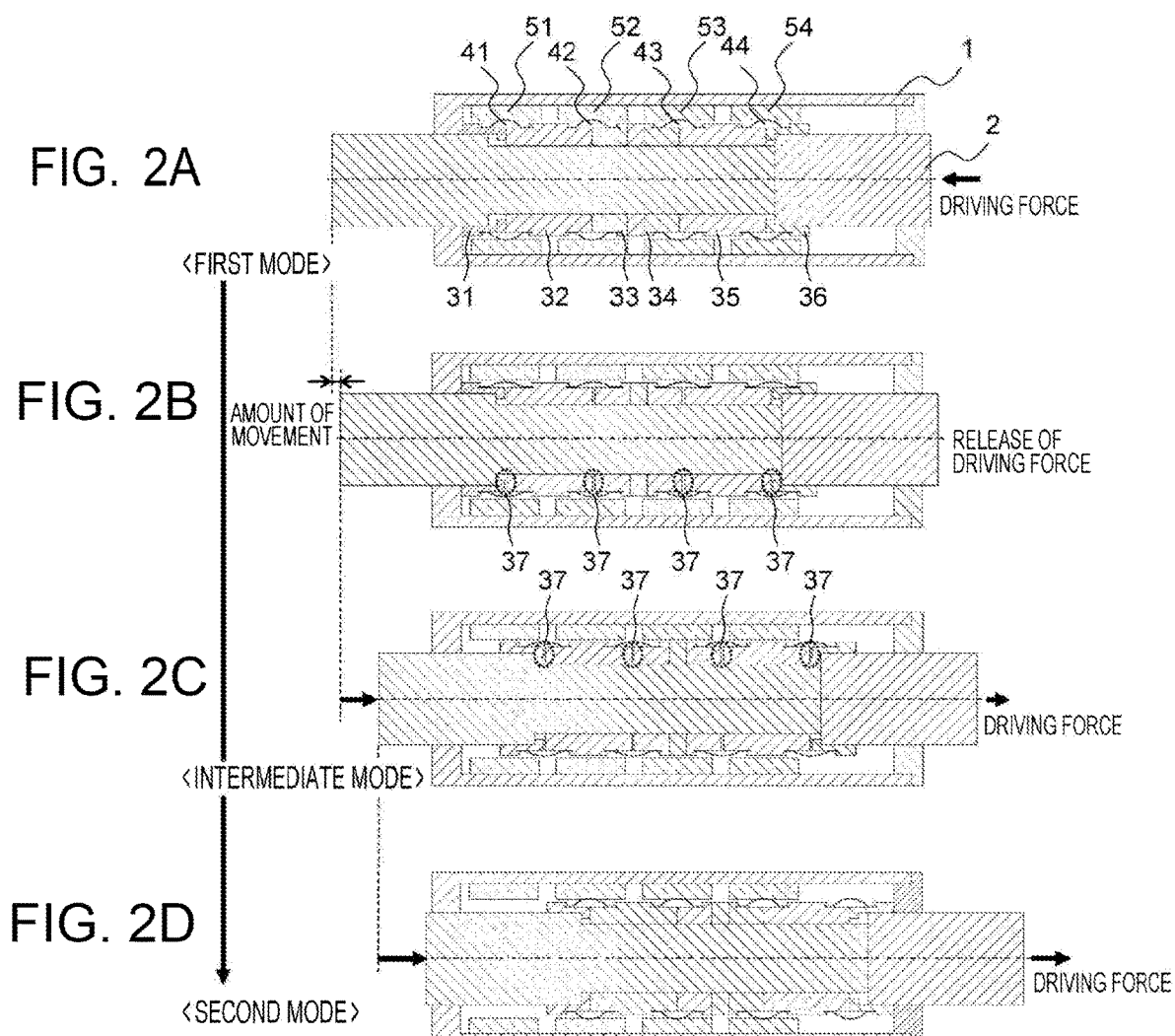

<FIRST MODE>

<INTERMEDIATE MODE>

<SECOND MODE>

SWITCH AND WINDING SWITCHING DEVICE

TECHNICAL FIELD

The present invention relates to a switch, and particularly to a technique suitable for a winding switching device that switches windings of a rotating electrical machine.

BACKGROUND ART

A motor for driving an electric vehicle, such as an electric car or a hybrid vehicle, has low system efficiency in a low-speed range, and it is necessary to improve energy efficiency. Therefore, there is a winding switching technique for switching windings between a low-speed range and a high-speed range. For example, a current is reduced to ½ of the conventional current by increasing a voltage with a series connection at low speed. As a result, conduction loss and switching loss of an inverter semiconductor element are halved, so that inverter efficiency is improved, the system efficiency is improved, and energy consumption can be reduced.

As a background art of the present technical field, there is JP 2017-70112 A (PTL 1). JP 2017-70112 A discloses a winding switching device that switches connection states of windings of an electric motor including a plurality of windings, the winding switching device including a device main body, a movable body, and a drive device that drives them in a switching direction. The device main body includes a plurality of electrodes to which end portions of the windings are respectively connected. The movable body includes a series connection circuit part and a two-parallel connection circuit part. There is described the winding switching device in which: the series connection circuit part includes a plurality of counter electrodes in contact with the electrodes of the device main body and a series connection electric circuit that connects the windings in series; and the series connection circuit part includes a plurality of counter electrodes in contact with the electrodes of the device main body and a two-parallel connection electric circuit that connects the windings in parallel (see ABSTRACT).

CITATION LIST

Patent Literature

PTL 1: JP 2017-70112 A

SUMMARY OF INVENTION

Technical Problem

In the technique described in PTL 1 described above, contact resistance is reduced by pressing contact points against each other with the repulsive force of a spring, so that there is a problem that a sliding part is worn when the contact points are switched.

An object of the present invention is to achieve high reliability and long life of a switch by achieving sliding-less switching of connection in a state where contact points are separated from terminals when the contact points are switched.

Solution to Problem

A typical embodiment of the invention disclosed in the present application is as follows. That is, a switch that switches an electrical connection state includes: a first terminal and a second terminal that are adjacently attached to a stator; a movable shaft movable in a first direction and a second direction opposite to the first direction; a plurality of movers attached to the movable shaft; and a movable segment that is connected to two of the plurality of movers and biases the two movers in a direction in which the two movers are away from each other, in which the switch is capable of switching among: a first mode in which, when the movers move in the first direction, the mover is pushed by the stator to deform the movable segment so as to protrude toward the terminal, and the movable segment comes into contact with the first terminal; an intermediate mode in which deformation of the movable segment by the movers is released, and the movable segment is in contact with neither the first terminal nor the second terminal; and a second mode in which, when the movers move in the second direction, the mover is pushed by the stator to deform the movable segment so as to protrude toward the terminal, and the movable segment comes into contact with the second terminal.

Advantageous Effects of Invention

According to the present invention, wear, possibly occurring when contact points are switched, can be reduced while contact resistance is reduced. Problems, configurations, and advantageous effects other than those described above will be clarified by the following description of embodiments.

BRIEF DESCRIPTION OF DRAWINGS

FIGS. 2A to 2D are cross-sectional views of the winding switching device of the first embodiment.

DESCRIPTION OF EMBODIMENTS

Hereinafter, a winding switching device will be described as an embodiment of a device using a switch according to the present invention.

First Embodiment

Figure 1:
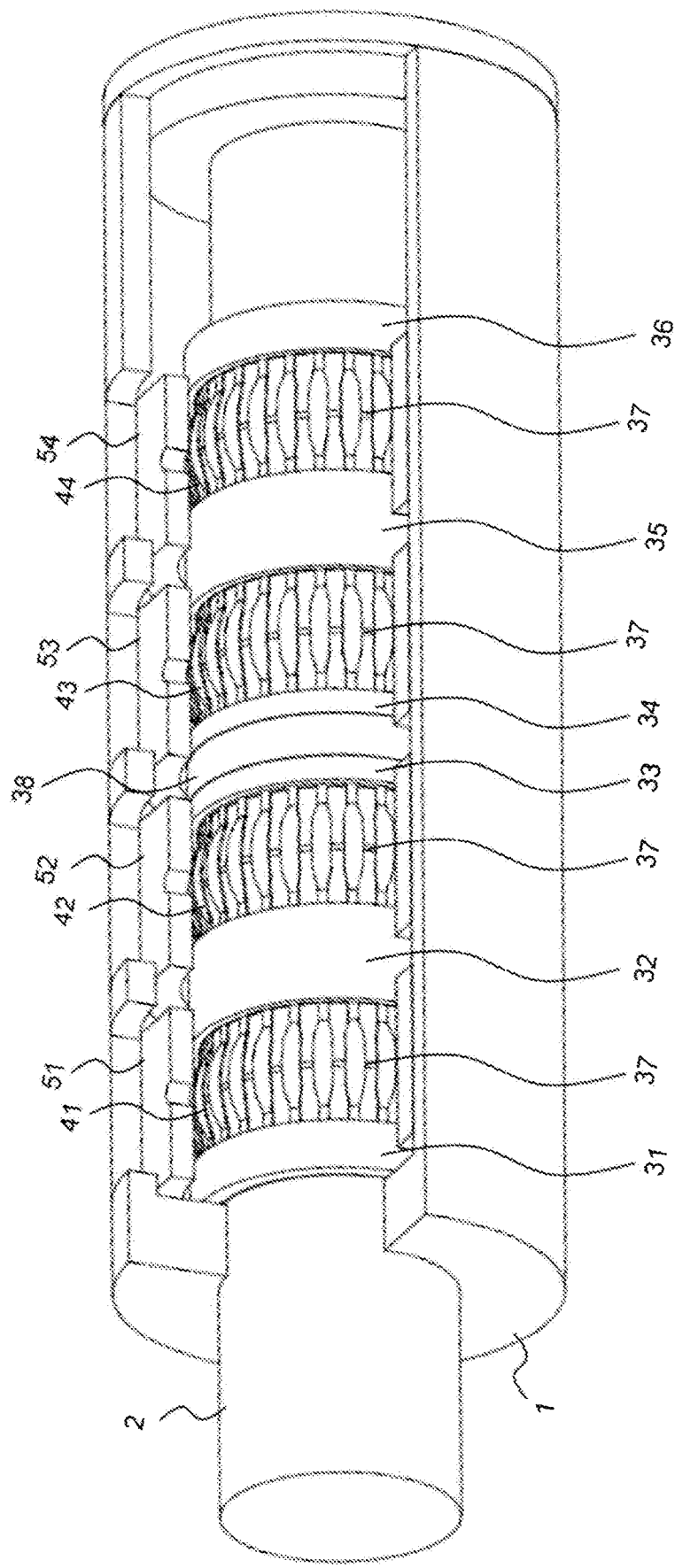
FIG. 1 is a perspective view of a winding switching device of a first embodiment.

FIG. 1 is a perspective view of a winding switching device of a first embodiment of the present invention, which illustrates ¾ of the cross sections of a stator 1 and terminals 51 to 54, ¼ of the cross sections thereof being cut out.

The winding switching device illustrated in FIG. 1 includes the stator 1 formed in a cylindrical shape, a movable shaft 2 movable, in an axial direction, inside the stator 1, a plurality of movers 31 to 36 attached, slidably in the axial direction, around the movable shaft 2, movable segments 41 to 44 respectively attached between adjacent two of the movers 31 to 36, and the terminals 51 to 54 attached to an inner periphery of the stator 1. The movers 31 to 36 are biased, in a direction in which gaps 37 are created, by spring properties of the movable segments 41 to 44. In a state where the movers 31 and 36 at both ends are not in contact with the stator 1, the gaps 37 are respectively created between adjacent two of the movers 31 to 36.

A switch constituting the winding switching device illustrated in FIG. 1 has, as a minimum configuration, the stator 1 formed in a cylindrical shape, the movable shaft 2 movable, in the axial direction, inside the stator 1, a plurality of the movers 31 and 32 attached, slidably in the axial direction, around the movable shaft 2, the movable segment 41 attached between the movers 31 and 32 that are adjacent to each other, and the terminals 51 and 52 that are adjacently attached to the inner periphery of the stator 1.

The stator 1 is formed in a cylindrical shape whose inside is hollow, which forms a case of the winding switching device. The shape of the outer surface of the stator 1 may be the illustrated cylindrical shape or another shape. The stator 1 is formed of an insulator (resin), and is provided with a hole through which electric signals flowing through the terminals 51 to 54 can be drawn externally. The terminals 51 to 54 are formed of a conductor (e.g., metal), and are formed in a cylindrical shape to be fixed to the inner periphery of the stator 1. Gaps are respectively provided between adjacent two of the terminals 51 to 54 in order to maintain insulation.

The movable shaft 2 is formed in a columnar shape so as to be movable, in the axial direction, inside the stator 1, and grooves, with which the movers 31 to 36 are to be engaged, are provided on an outer peripheral surface of the movable shaft 2 (see FIG. 2). The movable shaft 2 is formed of an insulator (resin).

The movers 31 to 36 respectively have ring shapes to be engaged with engagement grooves of the movable shaft 2, and are respectively attached over the entire outer periphery of the movable shaft 2 so as to be movable in the axial direction in the engagement grooves. The movable segment 41 is attached between the mover 31 and the mover 32 so that a contact point protrudes toward its outer periphery, the movable segment 42 is attached between the mover 32 and the mover 33 so that a contact point protrudes toward its outer periphery, the movable segment 43 is attached between the mover 34 and the mover 35 so that a contact point protrudes toward its outer periphery, and the movable segment 44 is attached between the mover 35 and the mover 36 so that a contact point protrudes toward its outer periphery.

The movers 31 to 36 are formed of an insulator (resin) or a conductor (metal). When the mover 32 is formed of a conductor, the movable segment 41 and the movable segment 42 conduct with each other via the mover 32. On the other hand, when the mover 32 is formed of an insulator, a conducting member (e.g., a jumper wire) for conducting the movable segment 41 and the movable segment 42 is required, but as a way to conduct them, the movable segment 41 and the movable segment 42 may be integrally formed. Similarly, when the mover 35 is formed of a conductor, the movable segment 43 and the movable segment 44 conduct with each other via the mover 32. On the other hand, when the mover 35 is formed of an insulator, a conducting member (e.g., a jumper wire) for conducting the movable segment 43 and the movable segment 44 is required, but as a way to conduct them, the movable segment 43 and the movable segment 44 may be integrally formed.

Since the movers 31 to 36 and the movable shaft 2 slide with each other, it is better to perform processing (e.g., PTFE fluorine coating) for reducing sliding resistance and improving lubricity on the inner surfaces of the movers 31 to 36 and the outer surface of the movable shaft 2. A spacer 38 formed of a ring-shaped insulator is provided between the mover 33 and the mover 34 to insulate between the movable segment 42 and the movable segment 43. The spacer 38 is movable in the axial direction along the movable shaft 2 as the movers 33 and 34 move.

The movable segments 41 to 44 are spring-like members obtained by processing a metal plate as described later, and are respectively attached between adjacent two of the movers 31 to 36. It is better to respectively attach the movable segments 41 to 44, for example, so as to be sandwiched between the opposing steps of the adjacent two of the movers 31 to 36. It is also better to respectively attach the movable segments 41 to 44 so as to be inserted between the opposing grooves of the adjacent two of the movers 31 to 36, because the movable segments 41 to 44 are difficult to come off even if the movers 31 to 36 move. The movable segments 41 to 44 have a spring shape protruding toward its outer periphery. In the state of not being pressed in the axial direction, the movable segments bias the movers 31 to 36 in a direction in which they are away from each other, so that the gaps 37 are respectively created between the adjacent two of the movers 31 to 36.

It is better to provide a sealing material between the movable shaft 2 and the stator 1 so as to maintain the airtightness of the internal space of the stator 1. It is better to encapsulate an insulating gas (e.g., sulfur hexafluoride gas) in the airtight internal space of the stator 1. By encapsulating an insulating gas in the internal space of the stator 1, the contact points can be disposed in the insulating gas, arc discharge, possibly occurring when connections are switched, can be suppressed, and the contact points can be switched while a current is flowing.

Figure 3A:
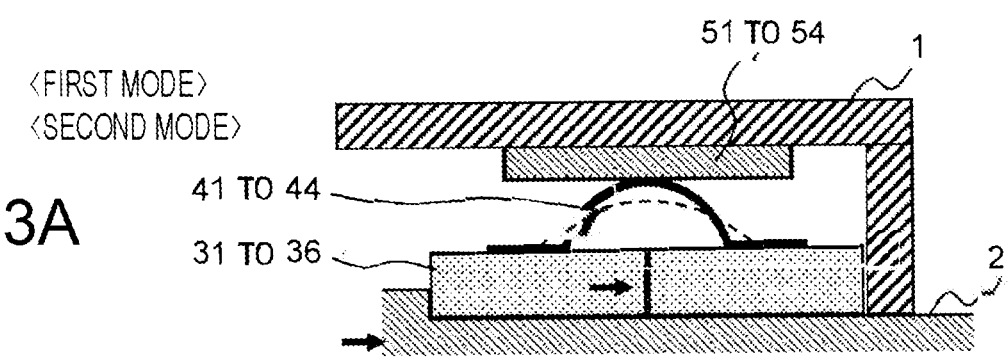
FIGS. 3A and 3B are views illustrating operation of a movable segment of the first embodiment.
Figure 3B:
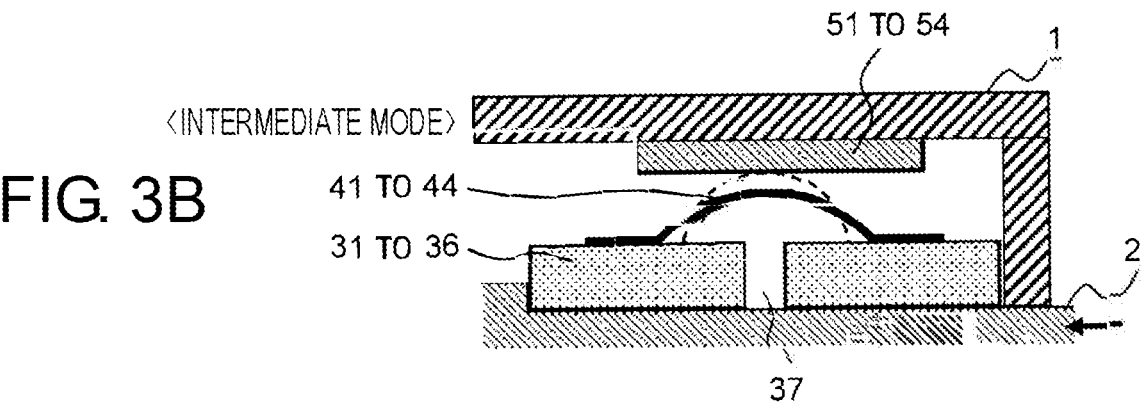
Figure 4A:
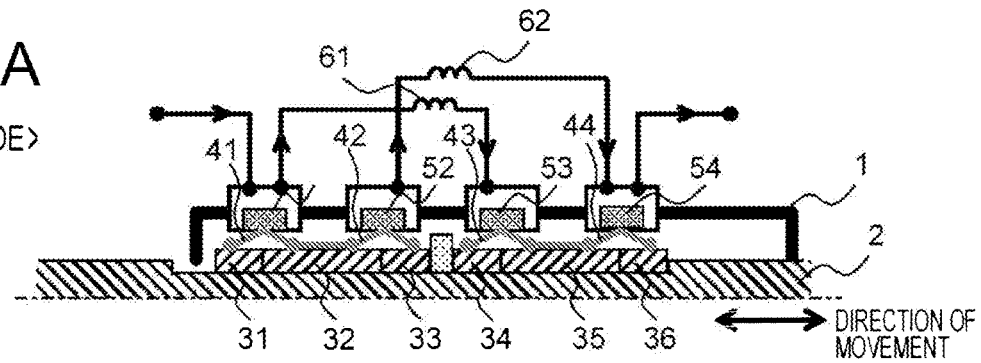
FIGS. 4A to 4C are views illustrating a connection example of the winding switching device of the first embodiment.
Figure 4B:
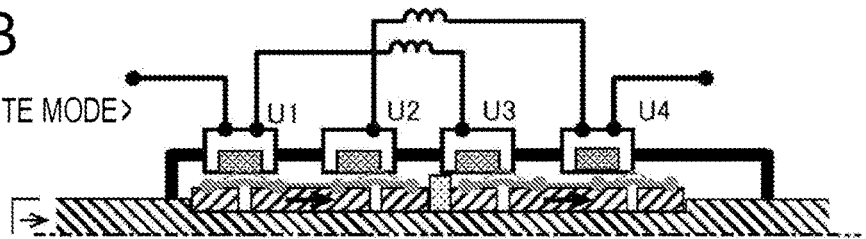

Next, the operation of the winding switching device of the present embodiment will be described with reference to FIGS. 2 to 4. FIG. 2 is a cross-sectional view of the winding switching device, illustrating a course of switching from a first mode to a second mode. FIG. 2(A) illustrates the first mode, FIGS. 2(B) and 2(C) illustrate an intermediate mode in the course of switching from the first mode to the second mode, and FIG. 2(D) illustrates the second mode. FIG. 3 is a view illustrating an operation of each of the movable segments 41 to 44, and FIG. 4 is a view illustrating a connection example of the winding switching device.

Figure 10:
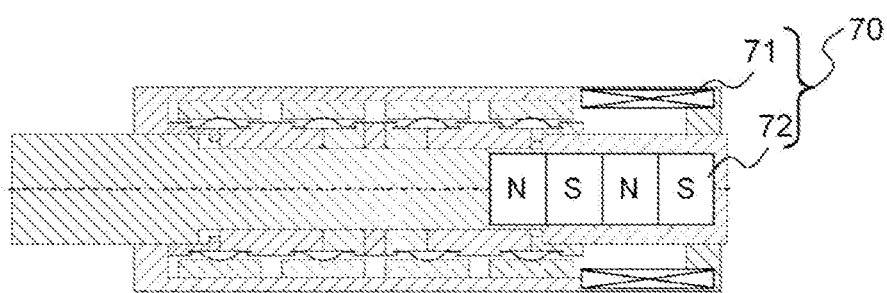
FIG. 10 is a cross-sectional view of a winding switching device of a second embodiment.

When the movable shaft 2 moves in the winding switching device of the present embodiment, facing relationships between the movable segments 41 to 44 and the terminals 51 to 54 are respectively changed, and the connections of the terminals 51 to 54 are changed. The movable shaft 2 may be operated by a person in order to be allowed to move, or may be driven by an actuator as illustrated in FIG. 10.

In the first mode illustrated in FIG. 2(A), a force, pushing from the right side in the view, is applied to the movable shaft 2, the movable shaft 2 moves to the left side, the step at the end portion of the engagement groove of the movable shaft 2 comes into contact with the mover 36, and the mover 36 is pushed to the left side. At this time, the mover 31 comes into contact with the stator 1. Therefore, the movers 31 to 36 are respectively sandwiched between the steps at the end portions of the engagement grooves of the movable shaft 2 and the stator 1, the movers 31 to 36 are each pushed by the stator 1 and the movable shaft, the gaps 37 with the movers 31 to 36 are eliminated (or the gaps 37 decrease), the movable segments 41 to 44 are biased in the axial direction to become shorter than their free lengths, amounts of protrusion, in an outer peripheral direction, of the movable segments 41 to 44 increase, the movable segments 41 to 44 are respectively pressed against the terminals 51 to 54, and the movable segments 41 to 44 and the terminals 51 to 54 respectively come into contact with each other (see FIG. 3(A)).

In the first mode, the movable segments 41 to 44 are respectively connected to the terminals 51 to 54, so that the terminal 51 and the terminal 52 conduct with each other, and the terminal 53 and the terminal 54 conduct with each other.

When the force applied to the movable shaft 2 is eliminated (or becomes weaker than the spring forces of the movable segments 41 to 44) and the movable shaft 2 is released in the intermediate mode illustrated in FIG. 2(B), the pressures, in the axial direction, on the movable segments 41 to 44 are eliminated, the movable segments 41 to 44 extend in the axial direction to return to the free lengths, and the gaps 37 are created between the movers 31 to 36. In addition, the amounts of protrusion, in the outer peripheral direction (terminals 51 to 54), of the movable segments 41 to 44 decrease, the movable segments 41 to 44 are separated from the terminals 51 to 54, and the movable segments 41 to 44 and the terminals 51 to 54 do not conduct with each other (see FIG. 3(B)).

In the intermediate mode illustrated in FIG. 2(C), a force, pulling to the right side in the view, is applied to the movable shaft 2, so that the movable shaft 2 moves to the right side in a state where the movable segments 41 to 44 are separated from the terminals 51 to 54. Since the movable segments 41 to 44 are separated from the terminals 51 to 54 when the movable shaft 2 moves, sliding-less electrical contacts can be realized, the reliability of the contact points can be improved, and the life of the contact points can be extended.

In the second mode illustrated in FIG. 2(D), a force, pulling to the right side in the view, is applied to the movable shaft 2, the movable shaft 2 further moves to the right side, the step at the end portion of the engagement groove of the movable shaft 2 comes into contact with the mover 31, and the mover 31 is pushed to the right side. At this time, the mover 36 comes into contact with the stator 1. Therefore, the movers 31 to 36 are respectively sandwiched between the steps at the end portions of the engagement grooves of the movable shaft 2 and the stator 1, the movers 31 to 36 are pushed by the stator 1 and the movable shaft, the gaps 37 between the movers 31 to 36 are eliminated (or the gaps 37 decrease), the amounts of protrusion, in the outer peripheral direction, of the movable segments 41 to 44 increase, and the movable segments 41 to 44 and the terminals 51 to 54 respectively come into contact with each other. In the first mode, the movable segments 41 to 43 are respectively connected to the terminals 52 to 54, so that the terminal 52 and the terminal 53 conduct with each other.

That is, when a force in a sliding direction that is larger than the spring force of the movable segment 41 is applied from the movable shaft 2 to the mover 32 via the movers 36 to 33, the gap 37 between the two movers 31 and 32 is eliminated (or decrease), and the height, in a terminal facing direction, of the movable segment 41 increases, so that connection to the terminal 51 can be made. When the force in the sliding direction applied to the mover 31 becomes smaller than the spring force of the movable segment 41, the spring force of the movable segment 41 causes the two movers 31 and 32 connected by the movable segment 41 to slide in a direction in which they are away from each other. When the movable segment 41 extends in the sliding direction, the height, in the terminal facing direction, of the movable segment 41 decreases, so that the movable segment 41 is separated from the terminal 51. Thereafter, when the movers 31 to 36 move in the sliding direction as the movable shaft 2 moves, and when a force in the sliding direction that is larger than the spring force of the movable segment 41 is applied to the mover 31, the gap 37 between the two movers 31 and 32 is eliminated (or decreases), and the height, in the terminal facing direction, of the movable segment 41 increases, so that connection to the terminal 52 can be made.

Figure 4C:
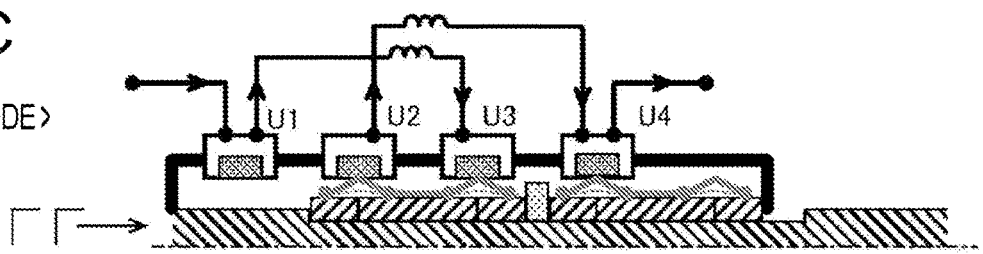

In the winding switching device of the present embodiment, the facing relationships between the movable segments 41 to 44 and the terminals 51 to 54 are changed by the movement of the movable shaft 2. In the first mode, the terminal 51 and the terminal 52 conduct with each other and the terminal 53 and the terminal 54 conduct with each other, and as illustrated in FIG. 4(A), a first winding 61 and a second winding 62 are connected in parallel. In the second mode, the terminal 52 and the terminal 53 conduct with each other, and as illustrated in FIG. 4(C), the first winding 61 and the second winding 62 are connected in series.

In the case, for example, of a rotating electrical machine for driving an electric vehicle, it is better to connect the first winding 61 and the second winding 62 in parallel in the first mode in a high-speed range and connect the first winding 61 and the second winding 62 in series in the second mode in a low-speed range. A rotating electrical machine for driving an electric vehicle generally has low system efficiency in a low-speed range. However, by connecting windings in series in a low-speed range to increase a voltage and halve a current, conduction loss and switching loss of a power element of an inverter can be reduced, efficiency of the inverter can be improved, and power consumption can be reduced.

Figure 5:
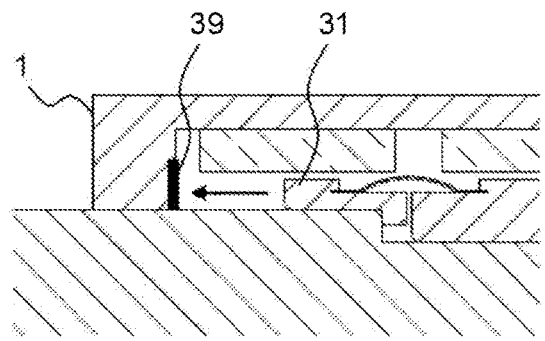
FIG. 5 is a cross-sectional view illustrating a contact portion between a stator and a mover of the first embodiment.

FIG. 5 is a cross-sectional view illustrating a contact portion between the stator 1 and the mover 31.

As described above, when a force, pushing the movable shaft 2 from the right side in the view, is applied, the movable shaft 2 moves to the left side to push the mover 36 to the left side, and the mover 31 comes into contact with the stator 1. A place where the mover 31 comes into contact with the stator 1 is preferably formed of a resin material, and particularly preferably formed of a soft resin material. For example, a soft resin piece is preferably attached to the place where the mover 31 comes into contact with the stator 1. Similarly, a portion where the mover 36 comes into contact with the stator 1 is preferably formed of a resin material, and particularly preferably formed of a soft resin material. The soft resin material forming a part of the stator 1 serves as an impact mitigating material, making it possible to reduce a sound generated when the mover 31 or 36 contacts the stator 1 and to reduce an operation sound of the winding switching device.

Figure 6:
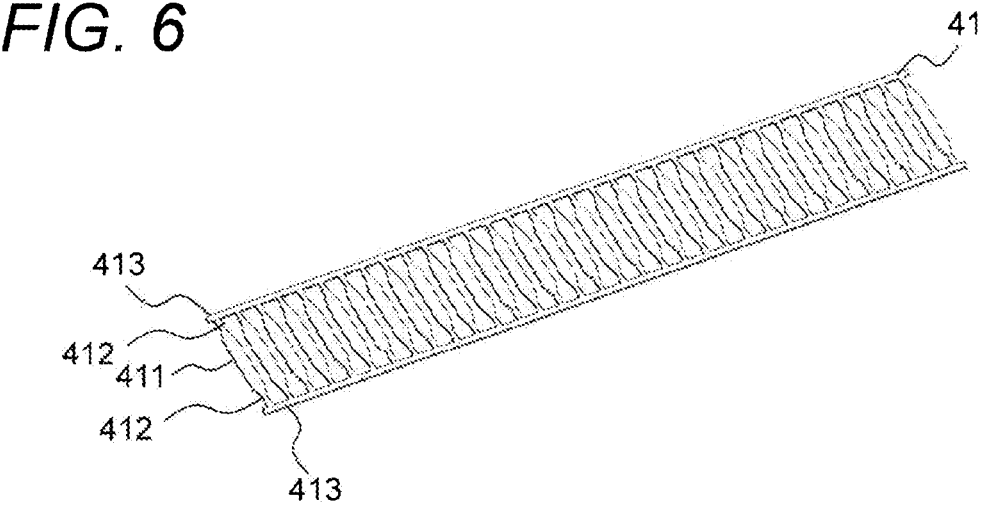
FIG. 6 is a view illustrating a plate-shaped member in the middle of being formed as the movable segment of the first embodiment.
Figure 7:
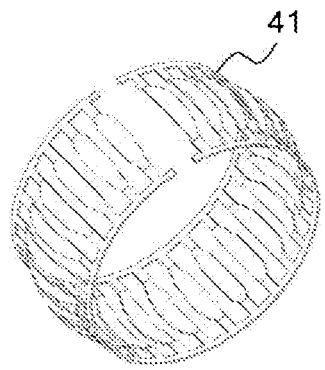
FIG. 7 is a view illustrating a state in which the plate-shaped member illustrated in FIG. 6 is rounded for being attached as the movable segment.
Figure 8:
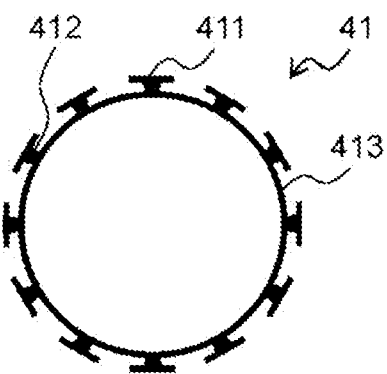
FIG. 8 is a schematic view of the movable segment illustrated in FIG. 7 as viewed from an axial direction.
Figure 9:
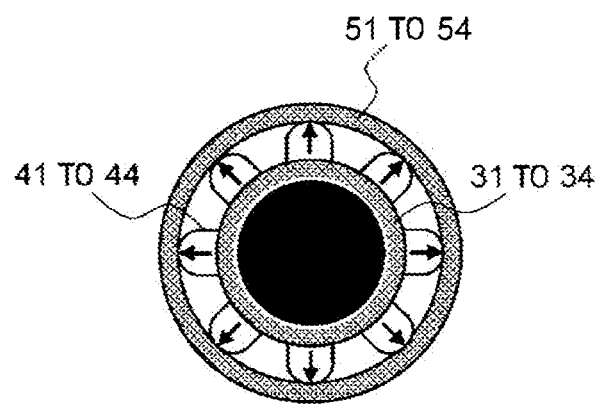
FIG. 9 is a schematic view illustrating a cross section of the winding switching device of the first embodiment.

Next, the movable segment 41 will be described with reference to FIGS. 6 to 9. FIG. 6 is a view illustrating a plate-shaped member in the middle of being formed as the movable segment 41, FIG. 7 is a view illustrating a state in which the plate-shaped member illustrated in FIG. 6 is rounded to be attached as the movable segment 41, FIG. 8 is a schematic view of the movable segment 41 illustrated in FIG. 7 as viewed from the axial direction, and FIG. 9 is a schematic view illustrating a cross section, at the position of the movable segment 41, of the winding switching device. Although the movable segment 41 will be described, the other movable segments 42 to 44 are configured in the same way.

As described above, the movable segments 41 to 44 are each formed in a spring shape by processing a metal plate. In each of the movable segments 41 to 44, a metal plate is processed into a shape as illustrated in FIG. 6, in which a plurality of center portions 411, end portions 412 constituting both ends of the center portions 411, and frames 413 each connecting the plurality of end portions 412 are formed. The center portions 411 are each formed in a flat plate shape, and the end portions 412 are each formed to have a narrower width than the center portions 411.

Thereafter, the end portions 412 of the movable segment 41 are each bent in an annular shape, as illustrated in FIGS. 7 and 8, and respectively attached to the movers 31 to 36. When a pressure is applied, between the two frames 413 and in the axial direction, to the movable segment 41 in this state, the center portions 411 are each deformed to protrude to the outer peripheral side, whereby the height of each of the center portions 411 is changed. As illustrated in FIG. 9, the height of the movable segment 41 is increased by being biased in the axial direction, and the movable segment 41 is pressed against the terminal 51 provided on the inner surface of the stator 1, so that the movable segment 41 comes into contact and conducts with the terminal 51. In particular, the end portions 412 of the movable segment 41 are formed to be narrower than the center portions 411, and each of the center portions 411 is formed in a flat bent shape even when the end portions 412 are bent (see FIG. 8). Therefore, the rigidity in the axial direction is lowered, the spring property in the axial direction is improved, the center portions 411 can be deformed with a weak force, and the driving force of the winding switching device can be reduced.

In addition, the plurality of the center portions 411 are disposed in an annular shape to form the movable segment 41, so that a variation in contact force between each of the center portions 411 and the terminal 51 can be suppressed. In addition, the center portions 411 press the terminal 51 over the entire periphery, so that the terminal 51 is not deformed due to the contact with the center portions 411, the stator 1 can be made thin, and the winding switching device can be reduced in size.

In addition, the center portions 411 are connected to the frames 413 via the end portions 412 each having a narrow width. By adjusting the widths of the center portions 411 and the widths of the end portions 412, both the driving force in the axial direction of the movable shaft 2 and the respective contact pressures between the movable segments 41 to 44 and the terminals 51 to 54 can be appropriately adjusted.

In addition, the center portions 411 are collectively manufactured by press working in which the shapes of the center portions 411 are uniform, so that the reliability of the winding switching device can be improved. Furthermore, the center portions 411 can be manufactured at low cost, so that cost can be reduced.

In the winding switching device of the first embodiment, when the force in the sliding direction to be applied to the movers 31 to 36 is made smaller than the spring forces of the movable segments 41 to 44, the two movers 31 to 36 connected by the respective movable segments 41 to 44 slide in a direction in which they are away from each other by the spring forces of the movable segments 41 to 44, as described above. When the movable segments 41 to 44 extend in the sliding direction, the heights, in a radial direction, of the movable segments 41 to 44 decrease, and the movable segments 41 to 44 are separated from the terminals 51 to 54. When a force in the sliding direction that is larger than the spring forces of the movable segments 41 to 44 is applied to the movers 31 to 36 through the movable shaft 2, the gaps 37 between adjacent two of the movers 31 to 36 are eliminated (or the gaps 37 decrease), the movable segments 41 to 44 are raised in the radial direction, the movable segments 41 to 44 respectively come into contact with the terminals 51 to 54, and the movable segments 41 to 44 are respectively connected to the terminals 51 to 54. By adopting a structure in which the movers slide in the direction of the movable shaft 2 as described above, the movable segments 41 to 44 move in a state where the contact points are separated by a power in one direction, so that wear of the terminals 51 to 54 can be reduced. In addition, partial contacts of the sliding portions can be prevented, and wear of the sliding portions can be reduced.

Second Embodiment

FIG. 10 is a cross-sectional view of a winding switch device of a second embodiment.

The winding switching device of the second embodiment is attached with an actuator 70 that drives the movable shaft 2 of the winding switching device of the first embodiment. The actuator 70 includes a coil 71 attached to the stator 1 and a magnet 72 attached to the movable shaft 2. When a direct current in a predetermined direction is applied to the coil 71, the magnet 72 is pushed out by the magnetism generated by the coil 71, so that the movable shaft 2 is biased in the left direction, and the first mode is created. On the other hand, when a direct current in the opposite direction is applied to the coil 71, the magnet 72 is drawn by the magnetism generated by the coil 71, so that the movable shaft 2 is biased in the right direction, and the second mode is created.

In the winding switching device of the second embodiment, by providing a drive unit (actuator 70) that moves the movable shaft 2, the system can be reduced in size more than a case where the drive unit is provided outside the winding switching device. In addition, when a ball screw or the like is used in the drive unit, wear occurs and the connection of the contact points is affected, but in the winding switching device of the second embodiment, the drive unit can also be made non-contact, maintainability can be improved, and life can be extended.

As described above, the switch constituting the winding switching device according to an embodiment of the present invention includes a first terminal 51 and a second terminal 52 that are adjacently attached to a stator 1, a movable shaft 2 movable in a first direction and a second direction opposite to the first direction, two movers 31 and 32 that are attached to the movable shaft 2, and a movable segment 41 that is connected to the two movers 31 and 32 and biases the two movers 31 and 32 in a direction in which they are away from each other. The switch is capable of switching among: a first mode in which when the movers 31 and 32 move in the first direction, the mover 32 is pushed by the stator 1 (via other movers 33 to 36) to deform the movable segment 41 so as to protrude toward the terminal 51, and the movable segment 41 comes into contact with the first terminal 51; an intermediate mode in which deformation of the movable segment 41 by the movers 31 and 32 is released, and the movable segment 41 is in contact with neither the first terminal 51 nor the second terminal 52; and a second mode in which when the mover 31 moves in the second direction, the mover 31 is pushed by the stator 1 to deform the movable segment 41 so as to protrude toward the terminal 52, and the movable segment 41 comes into contact with the second terminal 52. Therefore, connections can be switched in a state where the movable segment 41 is separated from the terminals 51 and 52, wear can be reduced while contact resistance of each of the terminals 51 and 52 and the movable segment 41 is reduced, the reliability of the switch can be improved, life can be extended, and maintenance-free can be achieved.

The winding switching device according to an embodiment of the present invention includes a first terminal 51 and a second terminal 52 that are connected to a winding 61, a third terminal 53 and a fourth terminal 54 that are connected to a second winding 62, a movable shaft 2 movable in a first direction and a second direction opposite to the first direction, a plurality of movers 31 to 36 attached to the movable shaft 2, and a plurality of movable segments 41 to 44 respectively connected to two of the plurality of movers 31 to 36 and bias the two of the movers 31 to 36 in a direction in which they are away from each other, in which the movable segments 41 to 44 include two first movable segments 41 and 42 electrically connected to each other and two second movable segments 43 and 44 electrically connected to each other. The winding switching device is capable of switching among: a first mode in which when the movers 31 to 36 move in the first direction, the two first movable segments 41 and 42 respectively move to positions respectively facing the first terminal 51 and the second terminal 52 and the two second movable segments 43 and 44 respectively move to positions respectively facing the third terminal 53 and the fourth terminal 54, the mover 36 comes into contact with the stator 1 to deform the movable segments 41 to 44 so as to respectively protrude toward the terminals 51 to 54, and the movable segments 41 to 44 respectively come into contact with the facing terminals 51 to 54; an intermediate mode in which deformations of the movable segments 41 to 44 by the movers 31 to 36 are released, and the movable segments 41 to 44 are into contact with none of the terminals 51 to 54; and a second mode in which when the movers 31 to 36 move in the second direction, the two first movable segments 41 and 42 respectively move to positions respectively facing the second terminal 52 and the third terminal 53 and one of the second movable segments 43 and 44 moves to a position facing the fourth terminal 54, the mover 31 comes into contact with the stator 1 to deform the movable segments 41 to 44 so as to respectively protrude toward the terminals 51 to 54, and the movable segments 41 to 44 respectively come into contact with the facing terminals 51 to 54. Therefore, connections are switched in a state where the movable segment 41 is separated from the terminals 51 and 52, so that wear can be reduced while the contact resistance of each of the terminals 51 and 52 and the movable segment 41 is reduced, the reliability of the switch can be improved, and life can be extended. In addition, by switching the connections between the terminals, the connections of a motor can be switched from series connection to parallel connection while an electric vehicle is accelerated, a motor current can be reduced while the necessary torque is secured in a low-speed range, inverter efficiency in a low-speed range can be improved, and electricity cost can be improved.

In addition, the movable segment 41 is formed in an annular shape and disposed on the outer periphery of the movable shaft 2, and the terminal 51 is formed in an annular shape so as to face the radial direction on the outer periphery of the movable segment 41. Therefore, a variation in contact force between each contact point (center portion 411) in the movable segment 41 and the terminal 51 can be reduced. In addition, the terminal 51 does not move by the contact force, so that the stator 1 is not required to be formed robustly, whereby the stator 1 can be reduced in size.

In addition, the movable segment 41 includes a plurality of the center portions 411 and end portions 412 respectively formed on both sides of the center portions 411 and each have a narrower width than the center portion 411, so that a driving force in the sliding direction and the contact pressure of the movable segment 41 can be adjusted according to the specification of the winding switching device.

In addition, the center portions 411 have a shape elongated in the axial direction and are connected, via the end portions 412, to frames 413 extending in the peripheral direction, and the movable segment 41 is formed by processing a metal plate. Therefore, the movable segment 41 can be collectively manufactured by, for example, press working, a variation in the shape of the movable segment 41 can be reduced, the reliability of the winding switching device can be improved, and manufacturing cost can be reduced.

In addition, the center portions 411 are formed to have a spring property by bending a metal plate, so that rigidity in the axial direction is lowered and the driving force of the movable shaft 2 can be reduced.

In addition, at least one of contact portions 39 between the stator 1 and the movers 31 and 36 is formed of a resin, so that an impact, occurring when the stator 1 comes into contact with the movers 31 and 36, can be mitigated by the resin, and a sound, occurring when the stator 1 comes into contact with the movers 31 and 36 (i.e., operation sound of the winding switching device) can be reduced.

In addition, the stator 1 has a cylindrical shape and is sealable, and an insulating gas is encapsulated inside, so that arc discharge, possibly occurring when contact points are switched, can be prevented, and the contact points can be switched while a current is flowing.

In addition, a coil 71 that generates a magnetic field when being powered is attached to the stator 1 and at least one magnet 72 is attached to the movable shaft 2, so that the movable shaft 2 moves in the first direction by an electromagnetic force between the coil 71 and the magnet 72. Therefore, the device can be reduced in size by providing, inside the winding switching device, an actuator 70 that drives the movable shaft 2.

Note that the present invention is not limited to the embodiments described above, and includes various modifications and equivalent configurations within the spirit of the appended claims. The embodiments described above have been described in detail, for example, for easy understanding of the present invention, and the present invention is not necessarily limited to those including all the configurations described above. In addition, a part of the configuration of an embodiment may be replaced with the configuration of another embodiment. In addition, the configuration of an embodiment may be added with the configuration of another embodiment. In addition, a part of the configuration of each embodiment may be added, deleted, or replaced with another configuration.

REFERENCE SIGNS LIST 1 stator
2 movable shaft
31 to 36 mover
37 gap
38 spacer
41 to 44 movable segment
51 to 54 terminal 61 first winding
62 second winding
70 actuator
71 coil
72 magnet
411 center portion
412 end portion
413 frame

The invention claimed is:

1. A switch that switches an electrical connection state, the switch comprising:
   a first terminal and a second terminal that are adjacently attached to a stator;
   a movable shaft movable in a first direction and a second direction opposite to the first direction;
   a plurality of movers attached to the movable shaft; and
   a movable segment that is connected to two of the plurality of movers and biases the two movers in a direction in which the two movers are away from each other,
   wherein the switch is capable of switching among:
     a first mode in which, when the movers move in the first direction, the mover is pushed by the stator to deform the movable segment so as to protrude toward the terminal, and the movable segment comes into contact with the first terminal;
     an intermediate mode in which deformation of the movable segment by the movers is released, and the movable segment is in contact with neither the first terminal nor the second terminal; and
     a second mode in which, when the movers move in the second direction, the mover is pushed by the stator to deform the movable segment so as to protrude toward the terminal, and the movable segment comes into contact with the second terminal.

2. A winding switching device that switches connection of windings, the winding switching device comprising:
   a first terminal and a second terminal that are connected to a first winding and are adjacently attached to a stator;
   a third terminal and a fourth terminal that are connected to a second winding and are adjacently attached to the stator;
   a movable shaft movable in a first direction and a second direction opposite to the first direction;
   a plurality of movers attached to the movable shaft; and
   a plurality of movable segments that are respectively connected to two of the plurality of movers and bias the two movers in a direction in which the two movers are away from each other, wherein
   the movable segments include two first movable segments electrically connected to each other and two second movable segments electrically connected to each other, and
   the winding switching device is capable of switching among:
     a first mode in which, when the movers move in the first direction, the two first movable segments respectively move to positions respectively facing the first terminal and the second terminal and the two second movable segments respectively move to positions respectively facing the third terminal and the fourth terminal, the mover comes into contact with the stator to deform the movable segments so as to respectively protrude toward the terminals, and the movable segments respectively come into contact with the facing terminals;
     an intermediate mode in which deformations of the movable segments by the movers are released, and the movable segments are in contact with none of the terminals; and
     a second mode in which, when the movers move in the second direction, the two first movable segments respectively move to positions respectively facing the second terminal and the third terminal and one of the second movable segments moves to a position facing the fourth terminal, the mover comes into contact with the stator to deform the movable segments so as to respectively protrude toward the terminals, and the movable segments respectively come into contact with the facing terminals.

3. The winding switching device according to claim 2, wherein
   the movable segments are formed in an annular shape and disposed on an outer periphery of the movable shaft, and
   the terminals are each formed in an annular shape so as to face a radial direction on an outer periphery of the movable segment.

4. The winding switching device according to claim 2, wherein
   the movable segments each include a plurality of center portions and end portions each formed on both sides of each of the center portions and having a narrower width than the center portion.

5. The winding switching device according to claim 4, wherein
   each of the center portions has a shape elongated in an axial direction and is connected to frames each extending in a peripheral direction via the end portions, and
   the movable segment is formed by processing a metal plate.

6. The winding switching device according to claim 5, wherein
   the center portion is formed to have a spring property by bending the metal plate.

7. The winding switching device according to claim 2, wherein
   at least one of contact portions between the stator and the movers is formed of a resin.

8. The winding switching device according to claim 2, wherein
   the stator has a cylindrical shape and is sealable, and an insulating gas is encapsulated inside.

9. The winding switching device according to claim 2, wherein
   a coil that generates a magnetic field when being powered is attached to the stator,
   at least one magnet is attached to the movable shaft, and
   the movable shaft moves in the first direction by an electromagnetic force between the coil and the magnet.

* * * * *